April 22, 1941.　　　A. L. WALLACE　　　2,239,408
TUBER FOR PLASTIC MATERIALS
Filed June 7, 1937　　　3 Sheets-Sheet 1

A. L. Wallace INVENTOR.
BY Thomas Howe
ATTORNEY.

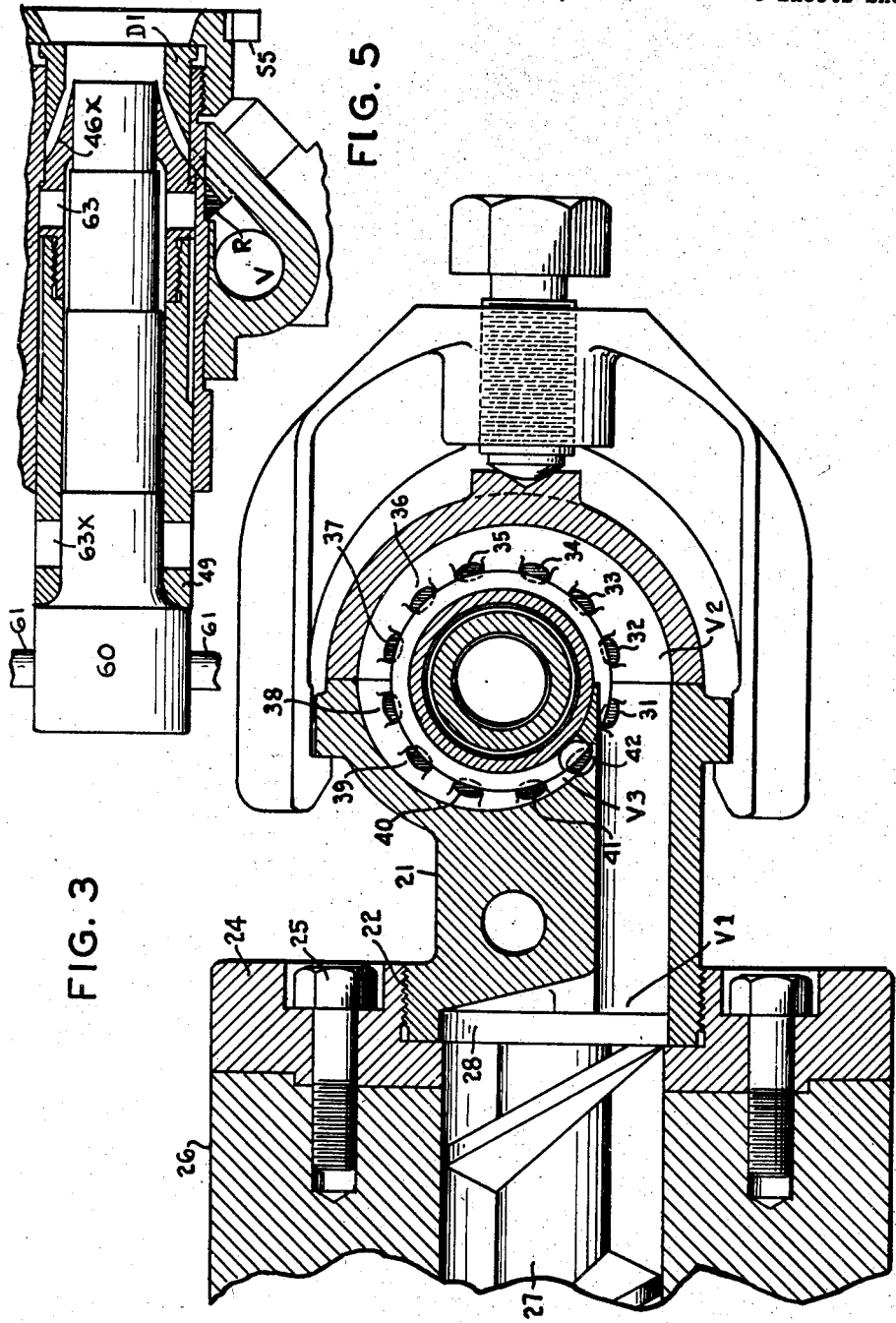

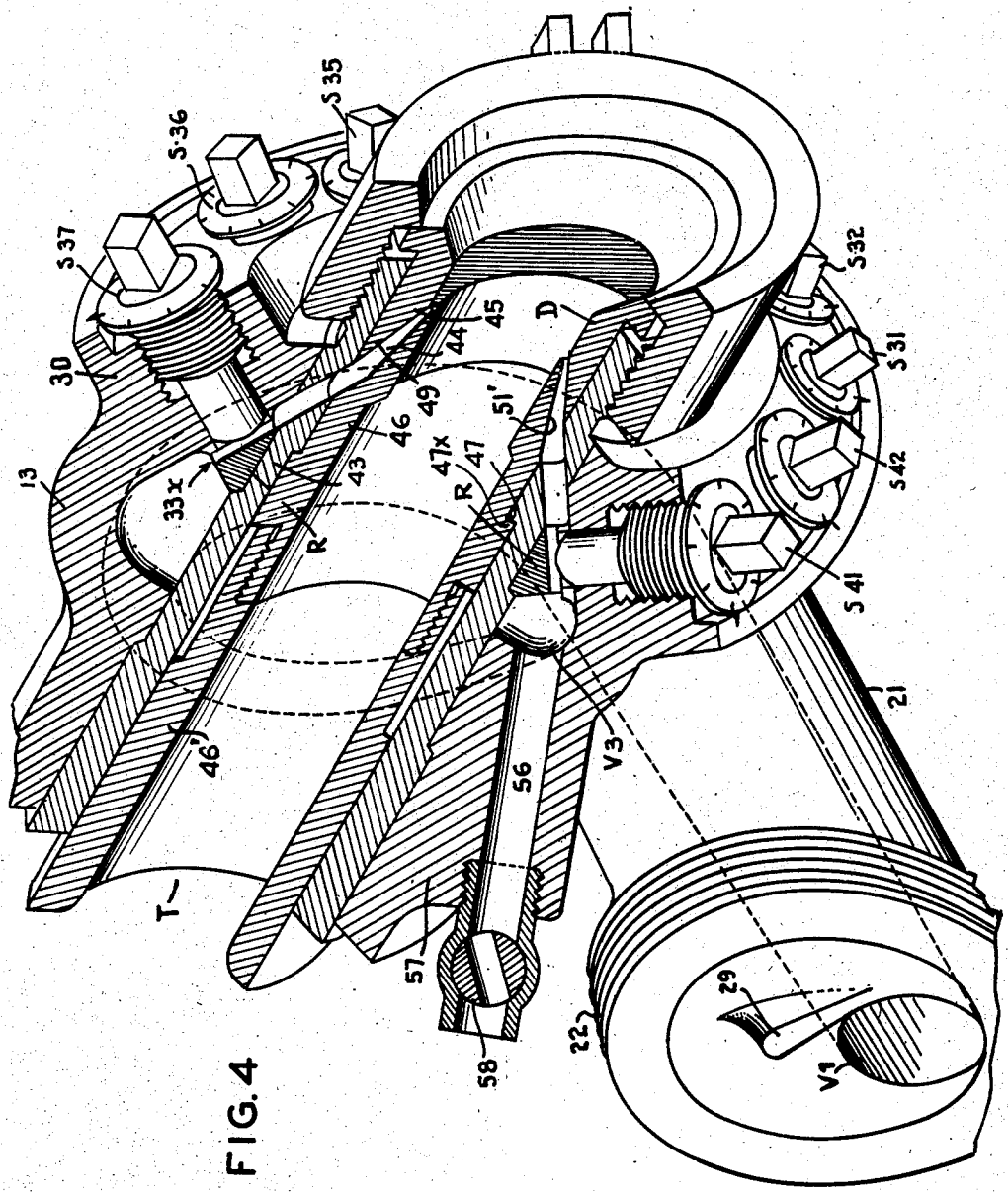

Patented Apr. 22, 1941

2,239,408

UNITED STATES PATENT OFFICE 2,239,408

TUBER FOR PLASTIC MATERIALS

Archibald L. Wallace, Northport, N. Y., assignor, by mesne assignments, of one-half to Archibald L. Wallace and one-half to Cherryfield Corporation, a corporation of Delaware Application June 7, 1937, Serial No. 146,845

12 Claims. (Cl. 18—13)

This invention relates to an extrusion head for a machine of the type known as a "tuber" designed to extrude a sheath of rubber along the exterior surface of a conduit which is advanced through a tuber head, such machines being well known to the trade.

The present invention has for its general object means for controlling more effectively the flow of rubber through the extrusion head of such a machine than has been possible heretofore in tubers of conventional structure, and a more particular object of the invention is to provide improved means for conducting the stream of rubber to a multiplicity of delivery points disposed circumferentially around the extrusion head in order to effect an even distribution of the material and its uniform application to the superficies of the conduit to be sheathed.

In pursuance of the above general object, a further object is to provide means to regulate the delivery of each subsidiary stream of rubber as it is delivered through branch ducts to a common extrusion channel having an orifice circumjacent to the path in which the conduit is advanced.

Another object is to provide a novel form of guide tube for the conduit as it is so advanced, the tuber head being provided for this purpose with a throat member so disposed with relation to the annular extrusion orifice that any of a series of separately formed throat-pieces adapted to guide conduits of different diameter may be readily mounted selectively in a single main throat member or bore of the extrusion head.

Another object is to provide a die or cheek of annular form so supported upon the main throat member, and in such relation to the mouth of the selected throat piece that the thickness of the stratum of rubber applied may be varied in virtual independence of the diameter of the throat piece and of the conduit being sheathed, such provision including a coupling of annular form screwed upon an exteriorly threaded seat formed upon the terminal of the main throat piece and adapted to hold the cheek piece at the right distance to effect extrusion of a sheath of the desired thickness.

Another object is to provide a feed channel of preferably volute contour and diminishing gradually in cross-sectional area from the region at which it receives the supply of rubber to the last branch delivery duct and to provide the manifold thus constituted with a bleeder exit by means of which a scavenger flow may be created through the manifold prior to the normal feeding operation.

Still other features of the invention include a means for plugging the throat in the absence of a tube while the above-mentioned scavenger operation is performed as a preliminary to applying the sheath, also means for so constructing the body of the head as a bipartite casing that one of the casing parts may be fixed upon a suitable part of the tuber structure and the other casing part may be secured to the first-named part and removed therefrom, readily, while the fixed part remains in its set position.

A further object of the invention is to provide apparatus of the character described wherein the smooth and free flow of the rubber therethrough is promoted by avoiding abrupt turns in the rubber channel.

Other and ancillary objects and features of the invention will be made to appear as the description of the particular physical embodiment selected to illustrate the invention progresses.

In the accompanying drawings, which illustrate the invention, like characters of reference have been applied to corresponding parts throughout the several views which make up the drawings in which:

Fig. 3 is a view in vertical section, on an enlarged scale, on the line 3—3 of Fig. 1;

Fig. 4 is a fragmentary detail view in perspective, on a larger scale, of the extrusion head forming part of the present invention, a quarter section of the head being shown as broken away to reveal inner structures; and Fig. 5 is a fragmentary detailed sectional view of the structure shown in Figs. 1-4 with a temporary plug for the preliminary flow of rubber.

Figure 1:
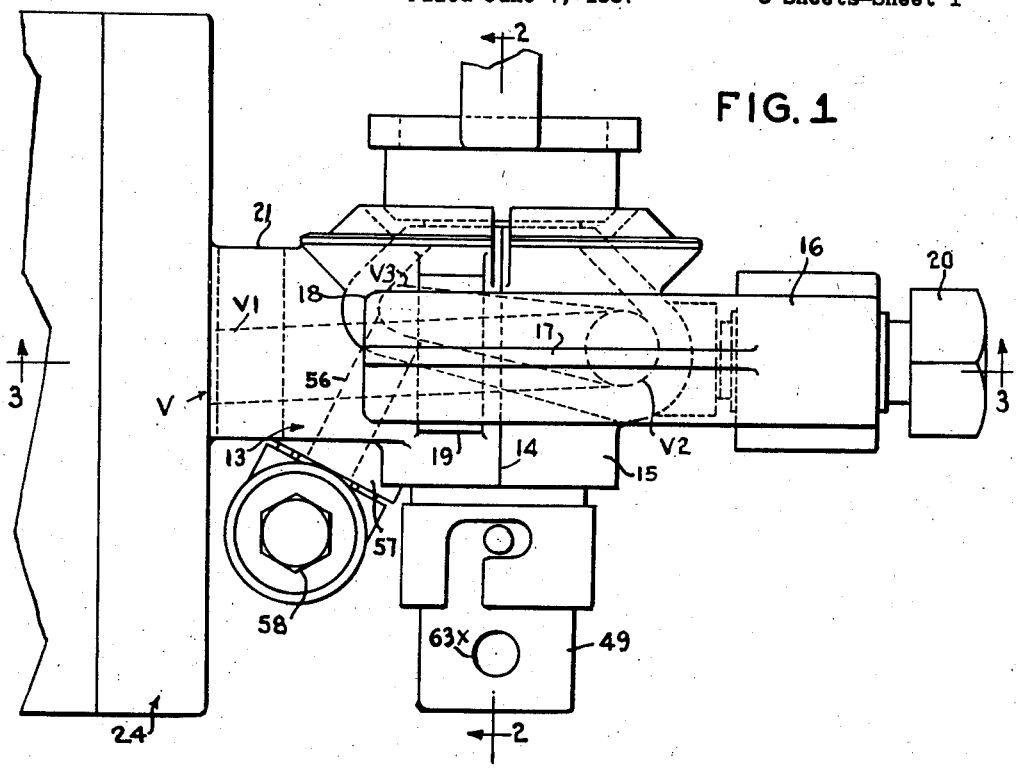
Fig. 1 is a view in elevation of an extrusion head of a "tuber" in the construction of which the present invention has been embodied.

In a now-preferred embodiment of the invention selected for illustration and description, and referring first to Figs. 1 to 4 inclusive, the reference character 11 designates part of the extrusion head of a "tuber" machine of any well known type.

From the base 24 extends horizontally a bracket 21 with which is formed integrally a casing 13, divided at 14 and provided with a separable cover or member 15 which may desirably be secured removably to the part 13 by suitable means, such as a yoke clamp or bail 16, the legs 17 of which have feet 18 adapted to stand behind lugs 19 with which the casing part 13 is provided. A set screw or bolt 20 is provided to insure a tight fit of the casing parts in their assembled relation, as shown in Fig. 1.

Through the body of the casing thus constituted is formed a manifold delivery channel of volute form designated generally by the reference character V, and which has an inlet portion V1 formed in a neck 21 threaded at 22 to permit it to be secured into a socket plate 24 secured, as by bolts 25, (see Fig. 3), to a machine part 26 which has a bore in which rotates a spiral conveyor device 27 of generally conventional structure adapted to deliver the stream of rubber stock to the tuber head.

The conveyor 27 rotates counterclockwise, and the orifice V1 is formed eccentrically, as shown in Fig. 4, in continuation of a shallow chamber or drum-like recess 28 that is partially bisected by a barrier or baffle 29 which directs the rubber stream suitably toward the orifice V1.

After passing through a straight reach in the neck 21 the material enters the volute portion of the main manifold channel, $V_2$ (see Fig. 3), the cross-sectional area of which diminishes progressively as it approaches the apex $V_3$ of the volute, this diminution in area being designed to provide for uniformity in the flow rate of the stream of rubber as its volume diminishes by reason of successive withdrawals of material through branch ducts 31 to 42 inclusive disposed in spaced relation around the manifold. The straight passage V1 merges gradually into the volute channel $V_2$ so that the material flows smoothly and is not subjected to sharp or abrupt turns.

In pursuance of the invention, each of the branch ducts has a gateway, as at 33X in Fig. 4 through which the flow of rubber can be regulated with nicety by the action of a gate member taking the form of one of a series of set screws S31 to S42, screwed through an enlargement 30 of the casing body 13. The gateway of each duct is formed in a ring of hard metal R, from which the duct continues through the main throat member 43, and then merges in a channel of annular form 44, which is defined by a nozzle 45 at the end of a throat or guide piece 46 of cylindrical form that is fitted slidingly into the main throat member 43, these members having complemental limit shoulders 47 and 47x which determine the normal position of the inner throat piece, the piece 46 being threaded to the sleeve 46'. The throat pieces 43 and 46 are preferably both maintained in fixed position relatively to each other and also to effect the adjustments necessary to permit different sized conduits, as C, shown in Fig. 2, in dash-dot lines, to be sheathed. Such adjustments can be effected readily by substituting for the throat piece 46 a similar throat piece of a different interior diameter.

The thickness of the sheathing material applied is determined by the position of the annular cheek or die D, against which and along which the rubber flows, en route to the annular extrusion orifice 50 and this cheek may desirably be made as a bushing of suitable diameter enclosing the opening 51 which shapes the material to final contour. This cheek has a beveled nose 49 disposed between the complemental bevelled nose 51' of the throat piece 46 and a coupling 52 which has a shoulder or flange 53 overlying the flange 54 which surrounds the lip of the cheek D. The latter can therefore be loosely mounted in position to be moved co-axially to different positions to satisfy certain conditions of operation encountered in working the tuber.

The coupling 52 is shown as having lugs 55 to be engaged by a spanner for the purpose of effecting adjustments of the cheek D by ample rotation of the coupling, it being understood that the flow of rubber will bias the cheek D into solid engagement with the limit flange 53 on the coupling.

Figure 2:
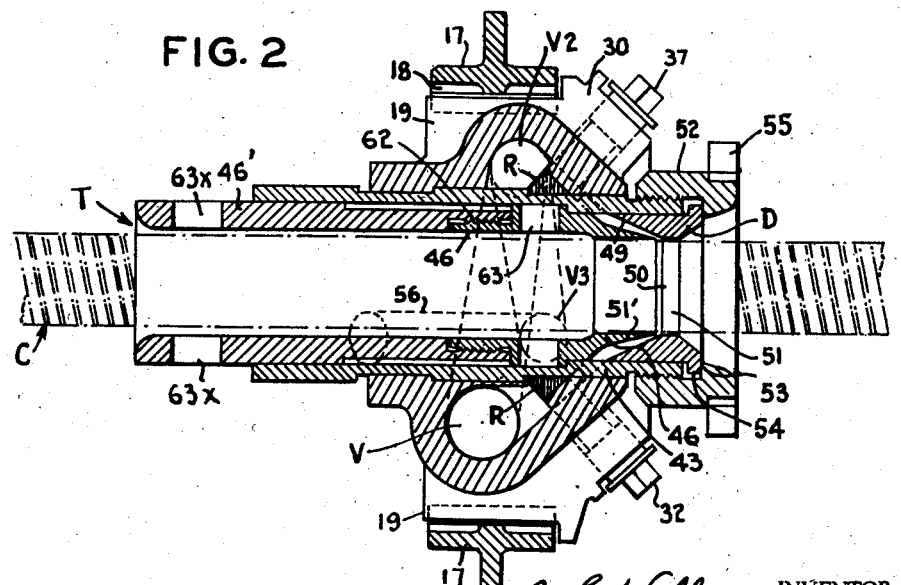
Fig. 2 is a view of the same in vertical section on the line 2—2 of Fig. 1.

In pursuance of another feature of the invention, a means is provided to permit a scavenger flow of material through the throat and the tuber head manifold, cleaning it of residual rubber in preparation for the service stream of sheathing material and this feature of the invention is shown best in Figs. 1, 2 and 4.

Referring to Fig. 4, a duct 56 is formed in an enlargement 57 of the casing body 13, the inner end of the duct 56 being in communication with the small end of the volute channel as at $V_3$, and a valve 58 is provided to control the flow of air or material through the bleeder 56.

In Fig. 5 is shown a plug 60 which can be inserted readily in the throat T to close the same during the scavenger operation when no tube C is present in the throat. A cross-bar 61 affords a suitable grip by means of which the plug can be manipulated.

It is to be noted that in the form illustrated in Fig. 5, the cheek $D_1$ is made with a larger central opening than that of the cheek D already described, and that the throat piece 46x is also of a different size, larger than the throat piece 43 of Fig. 2.

The butt 46' of the throat piece may desirably be made separately from the nozzle 51', and united thereto by a threaded joint as at 62. Each part of such a composite throat piece may be formed with holes, as 63, 63x, to receive a "tommy-bar" used to increase the purchase when unscrewing the parts, or screwing them together. The sticky character of the plastic rubber makes such provision desirable.

From the foregoing description it will be readily understood that the novel extrusion head herein disclosed constitutes a compact, sturdy device for its intended purpose, that it can be readily mounted and dismounted, in whole or in part, for inspection, alterations and replacements of parts, that it can be cleaned readily, and kept free from the residual particles of rubber which heretofore have shown a tendency to become vulcanized in such extrusion heads that provision is made for adjustment of all necessary and desirable kinds, and that the head affords means for more complete control of the flow of plastic material than devices known in the extrusion art.

While I have disclosed the best form of the device now known to me, I wish it to be understood that the particular physical embodiment of the invention selected for illustration and description does not exhaust the possible physical embodiments of the basic idea of means which underlies the present invention.

What I claim is:

1. An extrusion head of the class described, said head comprising a body having a throat adapted to receive movably a tube to be provided with a sheath, said throat having an extrusion orifice, a manifold including a main channel formed in said body circumjacent to said throat and a plurality of branch ducts connecting said main channel and said orifice for feeding plastic sheathing material around said tube and means, located in the branch ducts connecting the main channel with the extrusion orifice and at each of a plurality of circumferentially displaced points, for regulating the relative flow of material, each of said circumferentially displaced regulating means being operable independently of the others.

2. An extrusion head of the class described, said head comprising a body having a throat adapted to receive movably a tube to be provided with a sheath, a manifold including a main channel formed in said body circumjacent to said throat for feeding plastic sheathing material around said tube and means at each of a plurality of circumferentially displaced points for regulating the relative flow of material, each of said circumferentially displaced regulating means being operable independently of the others, said means including a series of branch ducts leading from said channel toward said throat and an extrusion orifice of substantially annular form in the wall of said throat and in communication with said channel through said branch ducts respectively.

3. An extrusion head having the features claimed in claim 1 in which said main channel substantially encircles the throat and is provided with an extension adapted to serve as a bleeding passage, having a valve means controllable manually to place said passage in communication at times with a zone of lesser pressure than prevails in the extrusion system, such as the atmosphere.

4. An extrusion head having the features claimed in claim 1 in which said main channel is of volute formation and substantially encircles said throat.

5. An extrusion head of the class described, said head having the features claimed in claim 1 and in which said main channel substantially encircles said throat and diminishes in cross-sectional area progressively longitudinally of such channel to compensate for withdrawals through said branch ducts.

6. An extrusion head of the class described, said head having the features claimed in claim 1 and in which the material flow regulating means comprises branch ducts, each of the ducts being provided with means to regulate the flow of plastic material therethrough and each of said duct-regulating means being operable independently of the other of said duct-regulating means.

7. An extrusion head of the class described, said head having the features claimed in claim 1 and an annular extrusion orifice, and in which means are provided to vary the size of said annular extrusion orifice, and thereby to control the thickness of the sheath extruded upon said tube.

8. An extrusion head of the class described, said head having the features claimed in claim 1 and an annular extrusion orifice, and in which means are provided to vary the size of said annular extrusion orifice, and thereby to control the thickness of the sheath extruded upon said tube, said last-named means comprising a cylindrical throat member defining a wall of said orifice and a cheek member of annular form adapted to define the opposite wall of said orifice.

9. An extrusion head of the class described, said head having the features claimed in claim 1 and an annular extrusion orifice, and in which means are provided to vary the size of said annular extrusion orifice, and thereby to control the thickness of the sheath extruded upon said tube, said last-named means comprising a cylindrical throat member defining a wall of said orifice and a cheek member of annular form adapted to define the opposite wall of said orifice and means to support said cheek member in adjusted position relatively to said throat terminal.

10. An extrusion head of the class described, said head having the features claimed in claim 1 and an annular extrusion orifice, and in which means are provided to vary the size of said annular extrusion orifice, and thereby to control the thickness of the sheath extruded upon said tube, said last-named means comprising a cylindrical throat member defining a wall of said orifice and a cheek member of annular form adapted to define the opposite wall of said orifice and means to support said cheek member in adjusted position relatively to said throat terminal, said supporting means being constituted by a rotatable coupling ring having a threaded connection with said throat member.

11. An extrusion head of the class described, comprising an annular extrusion orifice and a volute channel receiving the material for conduction to the orifice.

12. An extrusion head of the class described, said head having an annular extrusion orifice, regulable ducts for admitting the extruded material to said orifice and a volute channel receiving the said material and conducting it to said ducts.

ARCHIBALD L. WALLACE.